(12) United States Patent
Sawada

(10) Patent No.: US 8,630,085 B2
(45) Date of Patent: Jan. 14, 2014

(54) MOBILE COMMUNICATION TERMINAL

(71) Applicant: Kyocera Corporation, Kyoto (JP)

(72) Inventor: Kayoko Sawada, Daito (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/682,696

(22) Filed: Nov. 20, 2012

(65) Prior Publication Data

US 2013/0135839 A1     May 30, 2013

Related U.S. Application Data

(63) Continuation of application No. 12/677,796, filed as application No. PCT/JP2008/065945 on Sep. 4, 2008, now abandoned.

(30) Foreign Application Priority Data

Sep. 13, 2007    (JP) ................. 2007-237908

(51) Int. Cl.
*H05K 5/00* (2006.01)
*H05K 7/00* (2006.01)
*H04M 7/00* (2006.01)
*G06F 3/02* (2006.01)

(52) U.S. Cl.
USPC ............ 361/679.21; 361/679.06; 361/679.07; 361/679.16; 361/679.58; 455/575.4; 345/169

(58) Field of Classification Search
USPC ............... 361/679.01–679.3, 679.55–679.59, 361/679.21; 455/575.1, 575.3, 575.4, 455/575.8; 345/156, 157, 168, 169, 184
See application file for complete search history.

(56) References Cited

U.S. PATENT DOCUMENTS

| | | | |
|---|---|---|---|
| 2004/0108968 A1* | 6/2004 | Finke-Anlauff | ............... 345/1.1 |
| 2007/0197270 A1 | 8/2007 | Kim | |
| 2007/0285401 A1 | 12/2007 | Ohki et al. | |
| 2008/0161075 A1* | 7/2008 | Kim et al. | .................. 455/575.4 |

FOREIGN PATENT DOCUMENTS

| | | |
|---|---|---|
| JP | 11-167354 | 6/1999 |
| JP | 2003-224632 | 8/2003 |
| JP | 2007-166621 | 6/2007 |
| JP | 2008-271027 | 11/2008 |
| WO | WO-2006/051669 | 5/2006 |

OTHER PUBLICATIONS

International Search Report for PCT/JP2008/065945, mailed on Dec. 9, 2008, 2 pages.

* cited by examiner

*Primary Examiner* — Jayprakash N Gandhi
*Assistant Examiner* — Jerry Wu
(74) *Attorney, Agent, or Firm* — Duane Morris LLP

(57) ABSTRACT

A mobile communication terminal includes: a first housing and a second housing connected to each other by a connecting mechanism so as to be relatively movable; a first display placed on a front face of the first housing; and a second display placed on a front face of the second housing, wherein one end of the connecting mechanism is pivotably supported around a first shaft relative to one housing, and the other end of the connecting mechanism is slidably engaged in a direction perpendicular to the first shaft relative to the other housing.

8 Claims, 7 Drawing Sheets

MOBILE COMMUNICATION TERMINAL

RELATED APPLICATIONS

This application is a Continuation of application Ser. No. 12/677,796 filed Mar. 11, 2010, which is a National Stage application of PCT/JP2008/065945, filed Sep. 4, 2008, which claims priority to Japanese Application No. 2007-237908 filed Sep. 13, 2007, the contents of which are incorporated by reference herein in their entireties.

TECHNICAL FIELD

The present invention relates to a mobile communication terminal such as a portable telephone or the like, and particularly to a dual screen mobile communication terminal comprising a first housing and a second housing each including a display arranged thereon.

BACKGROUND ART

In recent years, portable telephones have been multi-functionalized more and more, and along with this, information to be displayed on a display has become various. Therefore, the size of a screen of the display has been increased. However, since the size of the screen of the display is limited by the size of the housing, the increase in the size of the display has a limitation.

It has been proposed that in a display apparatus for a mobile, two housings are foldably connected to each other, and each of the housings includes a display arranged on an inner face thereof so as to display more information with the two screens (e.g., Japan Patent Laid-Open 11-167354).

Therefore, considered is a foldable portable telephone comprising a first housing and a second housing foldably connected to each other, having a configuration in which a display is arranged on an inner face of each of the first housing and the second housing, or a sliding portable telephone comprising a first housing and a second housing slidably connected to each other, having a configuration in which a display is arranged on a front face of each of the first housing and the second housing.

DISCLOSURE OF EXEMPLARY EMBODIMENTS OF THE INVENTION

Problems to be Solved by the Invention

However, in the foldable portable telephone comprising the first housing and the second housing each provided with the display on the inner face thereof, the two displays are hidden with both the housings closed. Therefore, in order to enable information display at the time of telephone communication with the housings closed, it is necessary to further arrange a third display on the front face exposed with the housings closed. Thus, there is a problem of a complicated configuration.

In contrast, in the sliding portable telephone comprising the first housing and the second housing each provided with the display on the front face thereof, there is a step between the two displays when the housings are open. Therefore, when an image is displayed over the two display screens, since the image is greatly divided into two, it could bring a feeling of strangeness particularly in the case of a continuous image.

An object of the present invention is to provide a mobile communication terminal comprising a first housing and a second housing capable of information indication at the time of communication without using a third display with the housings closed, and moreover, capable of maintaining continuousness of an image to prevent a feeling of strangeness when the image is displayed over two display screens with the housings open.

Means for Solving the Problem

In a mobile communication terminal according to the present invention, a first housing 1 and a second housing 2 are connected to each other by a connecting mechanism 3 so as to be relatively movable, a first display 11 is placed on a front face of the first housing 1 and a second display 21 is placed on a front face of the second housing 2.

The first housing 1 and the second housing 2 are movable relative to each other between a closed position where a front face of the first display 11 is covered and a front face of the second display 21 are exposed, and an open position where the front face of the first display 11 and the front face of the second display 21 are aligned substantially flush with each other and the displays 11, 21 are set adjacent to each other.

With the mobile communication terminal according to the present invention described above, with the first housing 1 and the second housing 2 closed, a rear face of the second housing 2 is superposed on the front face of the first housing 1 to hide the first display 11. However, since the second display 21 arranged on the front face of the second housing 2 is exposed, information can be displayed at the time of communication by using the second display 21.

Also, with the first housing 1 and the second housing 2 open, the screen of the first display 11 and the screen of the second display 21 are arranged on substantially the same plane, and the screens of the displays 11, 21 are adjacent to each other. Therefore, in the case where an image is displayed over two screens of the displays, continuousness of the image can be maintained.

Also, in a mobile communication terminal in which a light-transmitting input touch panel 22 is placed on the second housing 2 so as to cover at least a part of the front face of the second display 21, with the first housing 1 and the second housing 2 placed at the closed position, on the second display 21 of the second housing 2, an indication regarding telecommunication function is performed, and information regarding telecommunication function can be inputted by operation of the second input touch panel 22.

Also, with the first housing 1 and the second housing 2 placed at the open position, indication over the screens of the displays 11, 21 is performed on the first display 11 of the first housing 1 and the second display 21 of the second housing 2.

In a particular configuration, a first input touch panel 12 is placed on the first housing 1 so as to cover a substantially entire front face of the first display 11, and a second input touch panel 22 is placed on the second housing 2 so as to cover a substantially entire front face of the second display 21.

According to this particular configuration, with the first housing 1 and the second housing 2 open, the first input touch panel 12 and the second input touch panel 22 are arranged on substantially the same plane, and the first display 11 and the second display 21 are adjacent to each other. Therefore, by displaying an image of a plurality of input keys (full keyboard) over the screens of the displays 11, 21, it is possible to input information using the input touch panels 12, 22.

In another particular configuration, the connecting mechanism 3 comprises a connecting piece 31 connecting a side face of the first housing 1 and a side face of the second housing 2 to each other. A pair of pins 33, 34 projects from the connecting piece 31. One pin 33 is pivoted on one housing, and the other pin 34 engages the other housing slidably.

According to this particular configuration, from a state where the first housing 1 and the second housing 2 are at the closed position, the other pin 34 slides along the other housing and thereby the other housing moves along the front face of the one housing, and thereafter the other housing rotates around the one pin 33, whereby the first housing 1 and the second housing 2 are arranged at the open position.

Alternatively, the connecting mechanism 3 comprises a base 4 holding the first housing 1, a pin 43 projecting from the side face of the first housing 1, and a pin 44 projecting from the side face of the second housing 2. The pin 43 of the first housing 1 and the pin 44 of the second housing 2 engage a guiding groove 42 of the base 4, and up and down movement of the first housing 1 with respect to the base 4 is guided and reciprocation of the second housing 2 along the front face of the first housing 1 is guided. The first housing 1 is urged by a spring 45 on the base 4 in an upper direction.

According to this particular configuration, from a state where the first housing 1 and the second housing 2 are placed at the closed position, the pin 43 of the second housing 2 moves along the guiding groove 42 in a direction parallel to the front face of the first housing 1, and thereby the second housing 2 reaches a movement end of the open position side. Thereafter, the first housing 1 is urged by a spring 45, and the pin 43 of the first housing 1 moves along the guiding groove 42 in a direction perpendicular to the front face of the first housing 1, whereby the first housing 1 reaches a lifting end. As a result, the first housing 1 and the second housing 2 are placed at the open position.

Effect of the Invention

According to the mobile communication terminal according to the present invention, with the first housing 1 and the second housing 2 closed, information at the time of communication can be indicated by the second display 21 of the second housing 2, and moreover, with the first housing 1 and the second housing 2 open, in the case where an image is displayed over the screens of the displays 11, 21, continuousness of the image can be maintained to prevent a feeling of strangeness regarding the image displayed over two displays.

Figure 1A:
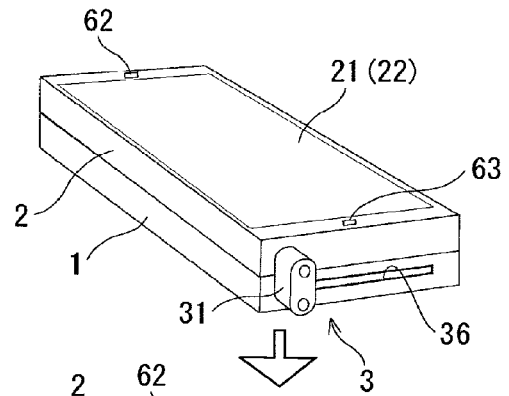
FIGS. 1(a)-1(d) provide a series of perspective views showing various relative positions of first and second housings of a portable telephone during an opening operation of the portable telephone in accordance with one embodiment of the invention.

EXPLANATION OF REFERENCE NUMERALS 1 first housing
11 first display
12 first input touch panel
2 second housing
21 second display
22 second input touch panel
3 connecting mechanism
31 connecting piece
36 guiding groove
4 base
42 guiding groove
62 speaker
63 microphone

BEST MODE FOR CARRYING OUT THE INVENTION

An embodiment in which the present invention is implemented in a portable telephone is to be described in detail below with reference to the drawings.

First Embodiment

As shown in FIGS. 1(a) to 1(d), a portable telephone of a first embodiment comprises a first housing 1 and a second housing 2 each having a flat rectangular parallelepiped shape, which are connected so as to be movable relative to each other by a connecting mechanism 3.

A first display 11 comprising a liquid-crystal display panel is placed on a front face of the first housing 1, and a transparent first input touch panel 12 is placed so as to cover an entire front face of the first display 11.

A second display 21 comprising a liquid-crystal display panel is placed on a front face of the second housing 2, and a transparent second input touch panel 22 is placed so as to cover an entire front face of the second display 21.

Also, on the front face of the second housing 2, a speaker 62 is provided to one end part, and a microphone 63 is provided to the other end part.

Figure 3:
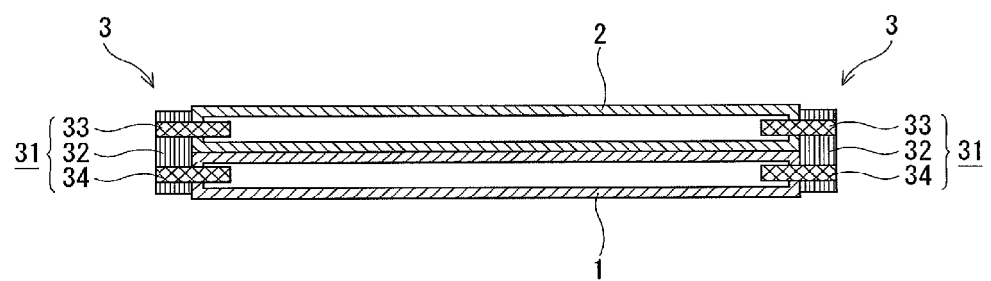
FIG. 3 is a cross-sectional view of the portable telephone in accordance with one embodiment.
Figure 4:
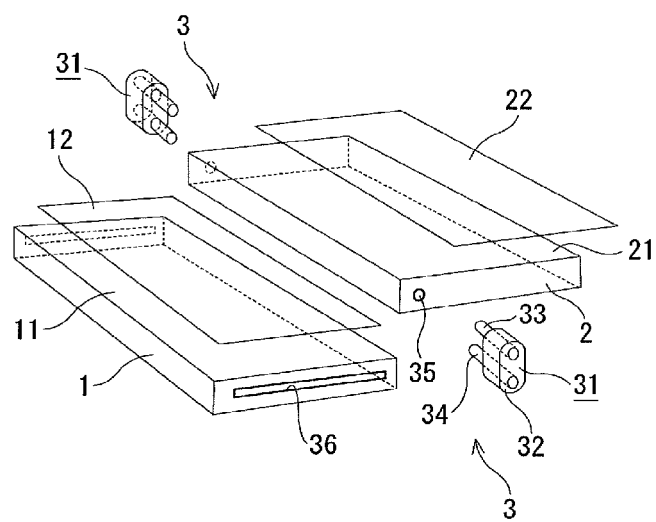
FIG. 4 is an exploded perspective view of the portable telephone in accordance with one embodiment.

The connecting mechanism 3 is arranged on either side of the first housing 1 and the second housing 2 as shown in FIG. 3. As shown in FIG. 4, each connecting mechanism 3 comprises a connecting piece 31 connecting a side face of the first housing 1 and a side face of the second housing 2 to each other, and a pair of pins 33, 34 projects from a body 32 of the connecting piece 31. Also, the side faces of the first housing 1 are each provided with a guiding groove 36 extending along the front face of the first housing 1 in a front and rear direction, and a pin hole 35 is provided in an end part of either side face of the second housing 2.

One pin 33 of the connecting piece 31 engages the pin hole 35 of the second housing 2 so as to be rotatable relative to each other, and the other pin 34 of the connecting mechanism 3 engages the guiding groove 36 of the first housing 1 slidably.

Figure 1B:
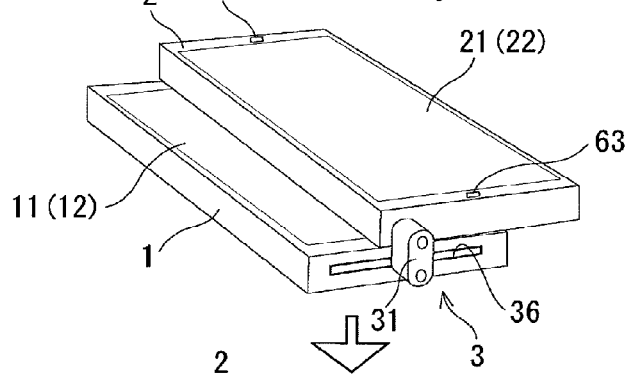
Figure 1C:
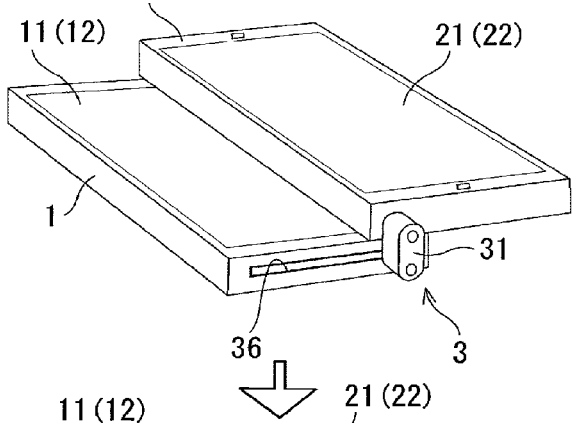
Figure 1D:
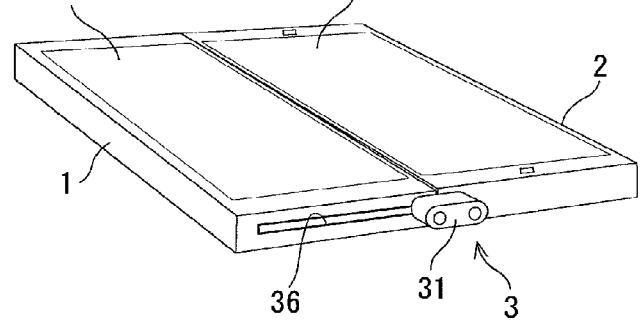
Figure 2A:
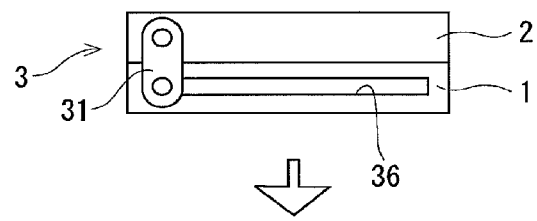
FIGS. 2(a)-(d) illustrate a series of side views of FIGS. 1(a)-(d), respectively.
Figure 2B:
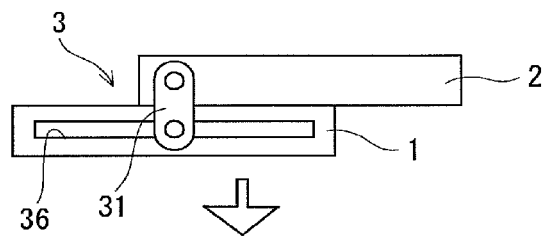
Figure 2C:
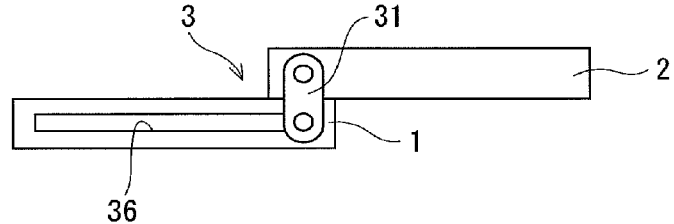

With the employment of the connecting mechanism 3 described above, from a closed position where a rear face of the second housing 2 is superposed on the front face of the first housing 1 as shown in FIGS. 1(a) and 2(a), the connecting piece 31 slides along the guiding groove 36 as shown in FIGS. 1(b) and 2(b), whereby the second housing 2 moves along the front face of the first housing 1, and the second housing 2 reaches a position where a large part of the first display 11 of the first housing 1 is exposed as shown in FIGS. 1(c) and 2(c). Thereafter, the connecting piece 31 rotates, and the second housing 2 rotates to the same height as the first housing 1 as shown in FIGS. 1(d) and 2(d).

As a result, the front face of the first display 11 and the front face of the second display 21 are aligned flush with each other, and the displays 11, 21 are set the closest to each other.

Figure 2D:
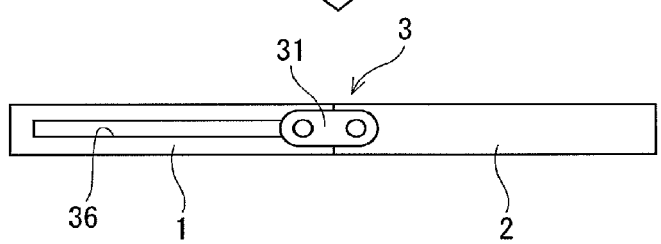

In order to avoid interference between the end part of the second housing 2 and the end part of the first housing 1 in the process of rotation of the second housing 2 from the state shown in FIGS. 1(c) and 2(c) to the state shown in FIGS. 1(d) and 2(d), the end parts of the housings 1, 2 are processed, or a rotation track of the first housing 1 by the guide of the guiding groove 36 is adjusted.

In the portable telephone described above, by moving either housing relative to the other housing, the first housing 1 and the second housing 2 can move from the closed position shown in FIG. 1(a) to the open position shown in FIG. 1(d), or can move from the open position shown in FIG. 1(d) to the closed position shown in FIG. 1(a).

Figure 7:
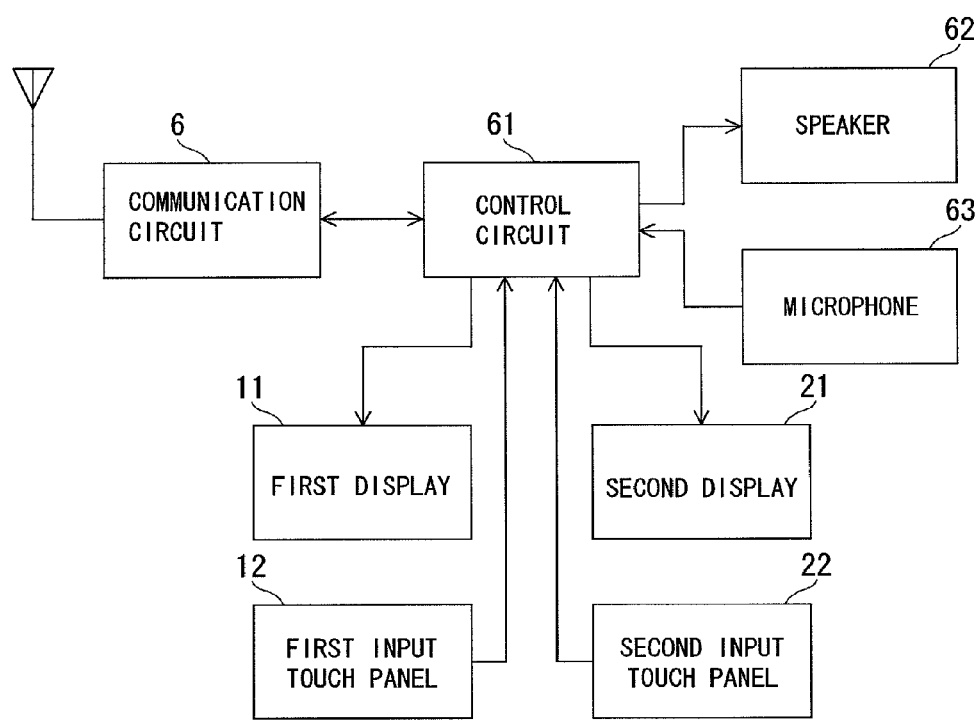
FIG. 7 is a block diagram showing an electrical configuration of a portable telephone in accordance with one embodiment of the invention.

FIG. 7 shows an electric configuration of the above described portable telephone. To a control circuit 61 comprised of a microcomputer or the like, connected are the above described first display 11, the first input touch panel 12, the second display 21 and the second input touch panel 22, as well as a communication circuit 6 for telephone communication, the speaker 62 for receiving voice, and the microphone 63 for transmitting voice.

Here, the electric connection between the first housing 1 and the second housing 2 is performed by a lead wire (not shown) extending through inside of the connecting piece 31.

Figure 8:
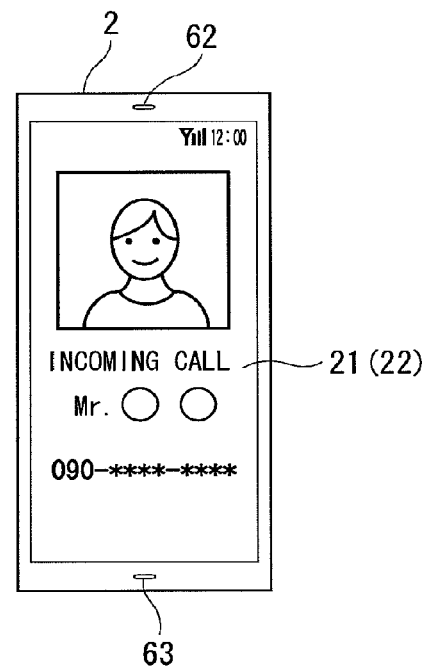
FIG. 8 is a plan view showing an example of displaying an image when a portable telephone is in a closed state in accordance with one embodiment.

In the portable telephone described above, a telephone communication mode is set with the first housing 1 and the second housing 2 placed at the closed position as shown in FIG. 1(a), and at the time of an incoming call, an image announcing the incoming call is displayed on the second display 21 of the second housing 2 as shown in FIG. 8. And then, a touch operation on the second input touch panel 22 at a position of an off hook key displayed on the second display 21 enables a call using the speaker 62 and the microphone 63.

Also, it may be a configuration to shift to an announcing state, in the case of announcing the incoming call, by touching any position on the touch panel which can be touched, or any position which can be touched other than a particular position for a call rejection key or the like, regardless of position displaying the off hook key.

Figure 9:
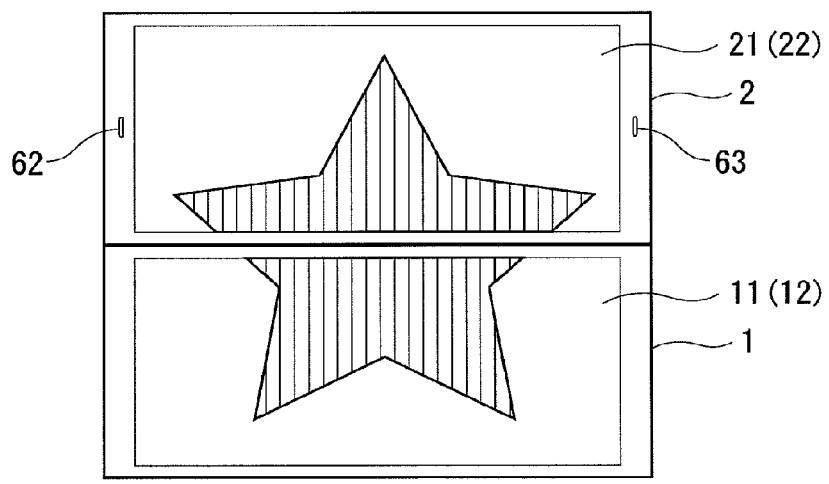
FIG. 9 is a plan view showing an example of displaying an image when a portable telephone is in an open state in accordance with one embodiment.

In contrast, with the first housing 1 and the second housing 2 placed at the open position as shown in FIG. 1(d), set are a TV reception mode, a music playback mode, an Internet screen display mode, a full keyboard display mode, and the like, so that an image can be displayed on the first display 11 of the first housing 1 and the second display 21 of the second housing 2 as shown in FIG. 9.

For example, in the case where one piece of continuous image is displayed over two screens of the first display 11 and the second display 21 as illustrated by an example in FIG. 9, the screen of the first display 11 and the screen of the second display 21 are arranged on the same plane, and they are as adjacent as possible to each other. Therefore, the continuousness of the image is maintained.

Also, in the full keyboard display mode, the screen of the first display 11 and the screen of the second display 21 are arranged on the same plane, and they are adjacent to each other. Therefore, it is possible to perform smoothly a key operation over the first input touch panel 12 and the second input touch panel 22.

Second Embodiment

As shown in FIGS. 5(a) to 5(d), a portable telephone of a second embodiment comprises a first housing 1 and a second housing 2 each having a flat rectangular parallelepiped shape, which are placed on a base 4 and connected so as to be movable relative to each other by a connecting mechanism 3.

A first display 11 comprising a liquid-crystal display panel is placed on a front face of the first housing 1, and a transparent first input touch panel 12 is placed so as to cover an entire front face of the first display 11.

A second display 21 comprising a liquid-crystal display panel is placed on a front face of the second housing 2, and a transparent second input touch panel 22 is placed so as to cover an entire front face of the second display 21.

Also, on the front face of the second housing 2, a speaker 62 is provided to one end part, and a microphone 63 is provided to the other end part.

Figure 6:
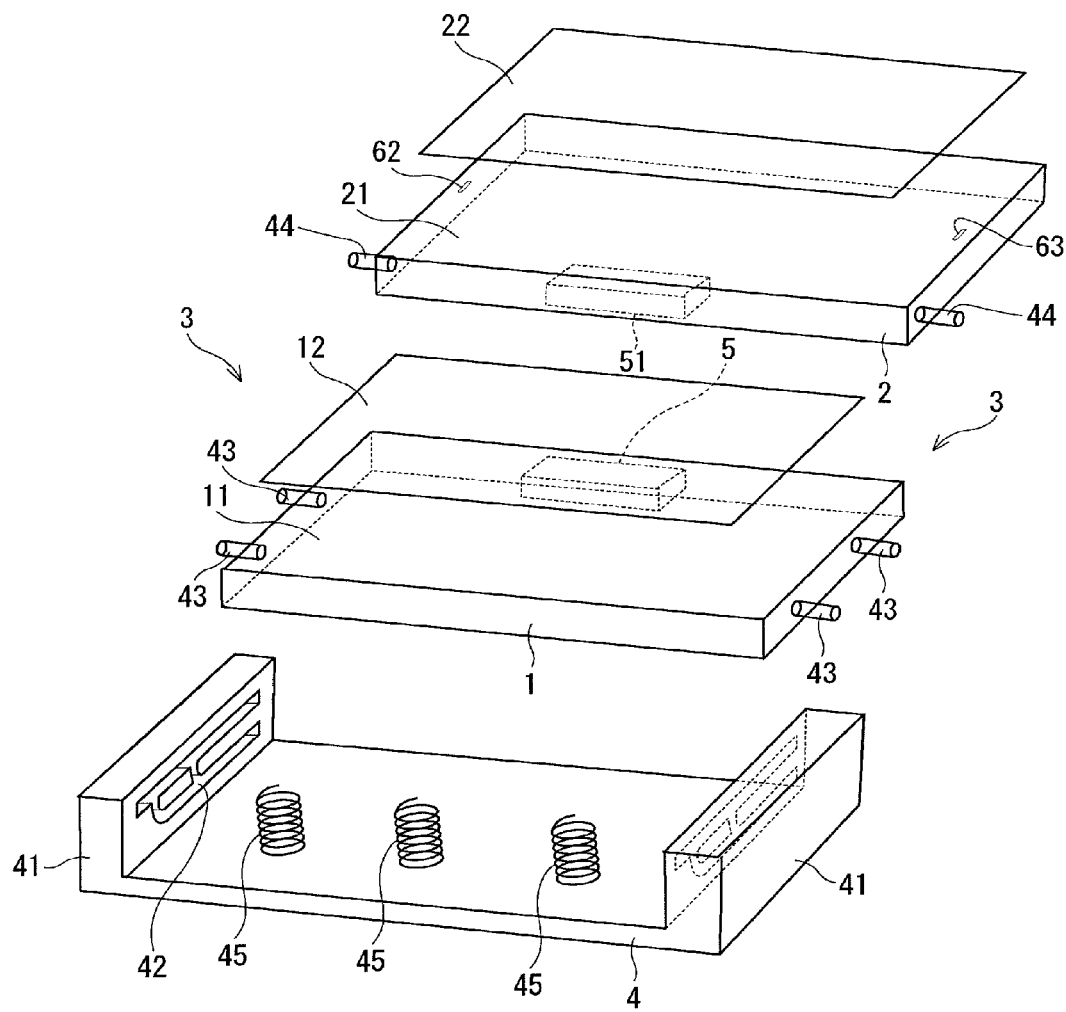
FIG. 6 is an exploded perspective view of the portable telephone of FIG. 5.

The connecting mechanism 3 is arranged on either side of the first housing 1 and the second housing 2 with the base 4 serving as a common element as shown in FIG. 6. The base 4 includes side walls 41, 41 on both sides thereof, and an inner face of each side wall 41 is provided with a guiding groove 42 including two horizontal parts along the front face of the first housing 1 and two vertical parts for connecting the horizontal parts to each other. Also, a front and rear pair of pins 43, 43 projects from either side face of the first housing 1, and a pin 44 projects from an end part of either side face of the second housing 2.

The pins 43, 43 of the first housing 1 and the pin 44 of the second housing 2 engage the guiding groove 42 of the base 4. Up and down movement of the first housing 1 with respect to the base 4 is guided and reciprocation of the second housing 2 along the front face of the first housing 1 is guided. A plurality of springs 45 are attached to a bottom face of the base 4 to urge the first housing 1 in an upper direction.

Also, in the first housing 1 and the second housing 2, a pair of magnets 5, 51 having polarity attracting each other is arranged at positions adjacent to each other.

Figure 5A:
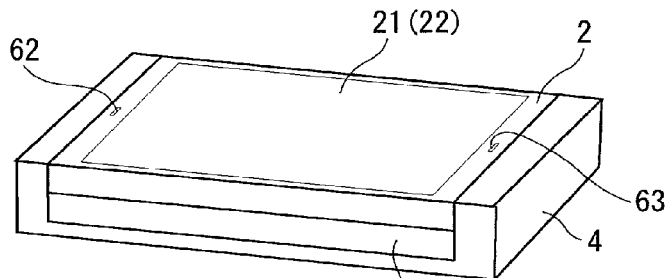
FIGS. 5(a)-(d) are a series of perspective views showing various relative positions of first and second housings of a portable telephone during an opening operation of the portable telephone in accordance with another embodiment.
Figure 5B:
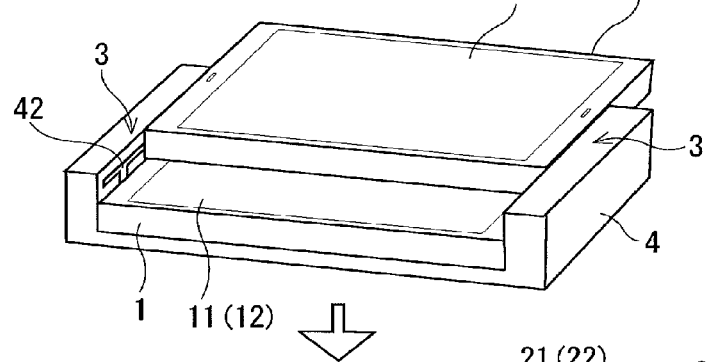
Figure 5C:
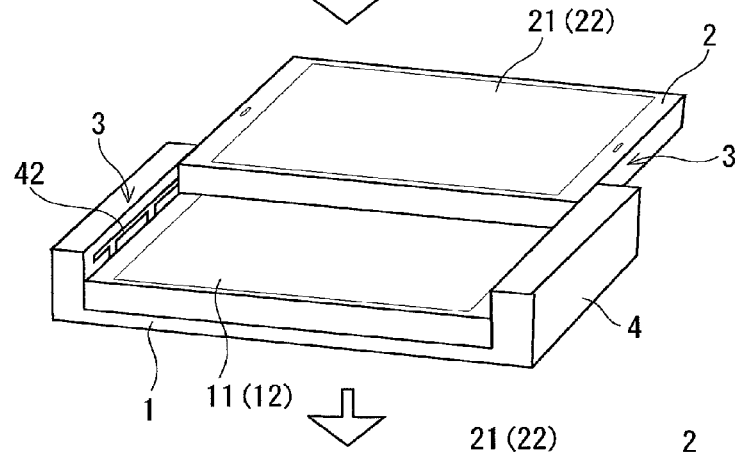
Figure 5D:
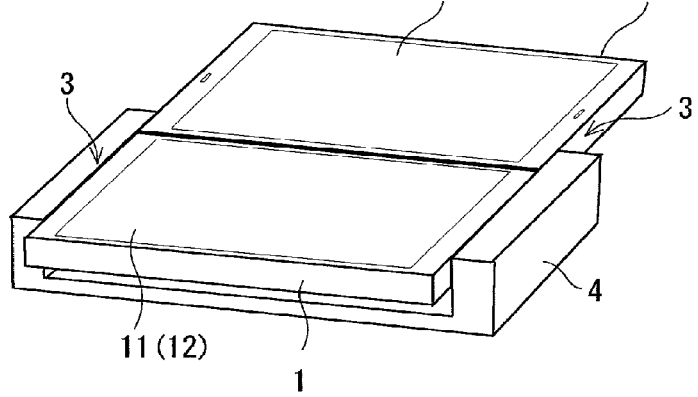

With the employment of the connecting mechanism 3 described above, from a closed position where a rear face of the second housing 2 is superposed on the front face of the first housing 1 as shown in FIG. 5(a), the second housing 2 slides along the horizontal parts of the guiding groove 42 as shown in FIG. 5(b), whereby the second housing 2 moves along the front face of the first housing 1, and the second housing 2 reaches a position where a large part of the first display 11 of the first housing 1 is exposed as shown in FIG. 5(c). Thereafter, the first housing 1 is urged by the springs 45 to slide along the vertical parts of the guiding groove 42. The first housing 1 is thereby moved up to the same height as the second housing 2 as shown in FIG. 5(d). At this time, the pair of magnets 5, 51 attracts each other to make the first housing 1 and the second housing 2 in close contact with each other.

As a result, the front face of the first display 11 and the front face of the second display 21 are aligned flush with each other, and the displays 11, 21 are set the most adjacent to each other.

In the portable telephone described above, it is possible to shift to the open position shown in FIG. 5(d) by sliding the second housing 2 from the closed position shown in FIG. 5(a) toward the open position, and then moving up the first housing 1. Also, it is possible to shift to the closed position shown in FIG. 5(a) by moving down the first housing 1 from the open position shown in FIG. 5(d), and then sliding the second housing 2 toward the closed position.

The electric configuration of the above described portable telephone is shown in FIG. 7. The mutual electric connection of the base 4, the first housing 1 and the second housing 2 is performed by a flexible lead (not shown).

In a similar way in the above described portable telephone, a telephone communication mode is set with the first housing 1 and the second housing 2 placed at the closed position as shown in FIG. 5(a), and at the time of an incoming call, an image announcing the incoming call is displayed on the second display 21 of the second housing 2 as shown in FIG. 8. And then, a call using the speaker 62 and the microphone 63 is enabled.

With the first housing 1 and the second housing 2 are at the open position as shown in FIG. 5(d), set are a TV reception mode, a music playback mode, an Internet screen display mode, a full keyboard display mode, and the like, so that an image can be displayed over the first display 11 of the first housing 1 and the second display 21 of the second housing 2 without losing its continuousness as shown in FIG. 9.

The present invention is not limited to the foregoing embodiment in construction but can be modified variously within the technical range set forth in the appended claims. For example, instead of the configuration of performing the off hook operation using the second input touch panel 22, it is also possible to employ a configuration of providing an operation key on the side face of the housing to perform the off hook operation using the operation key.

Also, the connecting mechanism 3 may be formed using various known connection mechanisms, not limited to the configuration described above.

What is claimed is:

1. A mobile communication terminal comprising:
    a first housing and a second housing connected to each other by a connecting mechanism so as to be relatively movable;
    a first display placed on a front face of the first housing; and
    a second display placed on a front face of the second housing,
    wherein one end of the connecting mechanism is pivotably supported around a first shaft relative to one housing of the first housing and second housing, and another end of the connecting mechanism pivotably engaged around a second shaft relative to another housing of the first housing and second housing,
    wherein the another end of the connecting mechanism is slidably engaged in a direction perpendicular to an axis of the first shaft, an axis of the second shaft is parallel to the axis of the first shaft,
    wherein the connecting mechanism is configured to cause the first housing and the second housing to be movable relative to each other between a closed position where the front face of the first display is covered by the second housing and the front face of the second display is exposed, and an open position where the front face of the first display and the front face of the second display are aligned substantially flush with each other without the first housing and the second housing overlapping with each other and the first display and the second display are set adjacent to each other,
    wherein, when the first housing and the second housing placed at the open position, a consecutive image is displayed on the first display in the first housing and the second display in the second housing.

2. The mobile communicator terminal according to claim 1,
    wherein the connecting mechanism cause the first housing and the second housing to move relative to each other from the closed position to the open position, and expose a surface of the first display and a surface of the second display, and then, move the both housings close to each other so that the surface of the both displays can be aligned substantially flush with each other.

3. The mobile communicator terminal according to claim 1,
    wherein the connecting mechanism is configured to be placed under the surfaces of the both housings at the open position of the first housing and the second housing.

4. The mobile communicator terminal according to claim 2,
    wherein the connecting mechanism is configured to be placed under the surfaces of the both housings at the open position of the first housing and the second housing.

5. The mobile communicator terminal according to claim 1,
    wherein the connecting mechanism is configured to be placed under the surfaces of the both housings at the open position of the first housing and the second housing.

6. The mobile communicator terminal according to claim 1,
    wherein the connecting mechanism is configured to include a connecting piece which connects the first housing and the second housing with each other,
    wherein an electric connection between the first housing and the second housing is performed by a lead wire extending through inside of the connecting piece.

7. The mobile communicator terminal according to claim 2,
    wherein the connecting mechanism is configured to include a connecting piece which connects the first housing and the second housing with each other,
    wherein an electric connection between the first housing and the second housing is performed by a lead wire extending through inside of the connecting piece.

8. The mobile communicator terminal according to claim 1,
    wherein the connecting mechanism is configured to include a connecting piece which connects the first housing and the second housing with each other,
    wherein an electric connection between the first housing and the second housing is performed by a lead wire extending through inside of the connecting piece.

* * * * *